United States Patent
Izawa et al.

[15] 3,670,033
[45] June 13, 1972

[54] PROCESS FOR THE PREPARATION OF 2,6-DIALKYLPHENOLS

[72] Inventors: Shin-Ichi Izawa; Katsuyuki Nakamura, both of Tokyo; Yoshiyuki Mizoguchi, Iruma-gun, all of Japan

[73] Assignee: Asahikasei Kogyo Kabushiki Kaisha, Osaka, Japan

[22] Filed: April 23, 1969

[21] Appl. No.: 818,776

[30] Foreign Application Priority Data

May 2, 1968 Japan...................................43/83622
May 11, 1968 Japan...................................43/83618

[52] U.S. Cl.......................................260/621 R, 260/624 C
[51] Int. Cl............................................................C07c 37/12
[58] Field of Search................260/621, 621 H, 624 C, 621 R

[56] References Cited

UNITED STATES PATENTS 3,280,201 10/1966 Hamilton et al....................260/621 R
3,514,492 5/1970 Juguin et al........................260/621 H
3,534,110 10/1970 Juguin et al........................260/621 H

*Primary Examiner*—Bernard Helfin
*Assistant Examiner*—Norman Morgenstern
*Attorney*—Oldham & Oldham

[57] ABSTRACT

This invention discloses a process for the preparation of 2,6-dialkylphenols which comprises reacting cyclohexanone with either formaldehyde or acetaldehyde in the vapor phase at a temperature of from 150° to 850° C. in the presence of a particular catalyst.

As a catalyst, a compound of metals of Group Ia of the Periodic Table of the Elements is employed in this invention, and a compound of metals of Group IVa and Va of the Periodic Table of the Elements may be employed, as a promotor, together with the above mentioned catalyst for the purpose of increasing the yield and selectivity of the product.

In contrast with the conventional methods, the present process can be economically and simply carried out to produce 2,6-dialkylphenol in high yield with a great industrial advantage.

6 Claims, No Drawings

PROCESS FOR THE PREPARATION OF 2,6-DIALKYLPHENOLS

This invention relates to a process for the preparation of 2,6-dialkylphenol and more particularly relates to a process for the preparation of 2,6-dialkylphenol which comprises reacting cyclohexanone with either formaldehyde or acetaldehyde in the vapor phase in the presence of a particular catalyst.

2,6-dialkylphenols have increased in importance as the raw materials for novel synthetic resins, for example, polyphenylene oxide in the plastics field.

There have been many known methods for the preparation of 2,6-dialkylphenol. For example, there is a method by methylation of phenol (Japanese Pat. Publication Nos.6894/1967 and 8255/1968), a method by debutylation of 2,6-demethyl-4-t-butylphenol (Netherlands Pat. No.290,847; Japanese Pat. Publication No.7450/1967), a method by vapor phase reaction of cyclohexanone with formaldehyde or acetaldehyde (French Patent No.1,377,943; Belgian Pat. No. 641,864; U.S. Pat. No.3,280,201) etc.

After the detailed invenstigation about the vapor phase reaction of cyclohexanone with either formaldehyde or acetaldehyde, we have unexpectedly found that a compound of metals of Group Ia of the Periodic Table of the Elements is more effective, as a catalyst, than other known catalysts to produce 2,6-dialkylphenol.

Further we have discovered that the yield and selectivity of 2,6-dialkylphenols are remarkably improved by employing a compound of metals of Group IVa and Va of the Periodic Table of the Elements, as a promotor, together with the above mentioned catalyst.

The compounds of metals of Group Ia of the Periodic Table of the Elements which are used as catalysts in this invention includes carbonates, bicarbonates, nitrates and oxides of a metal selected from the group consisting of lithium, sodium, potassium, rubidium and cesium and a compound of the general formula MOX, wherein M represents metals of the Group Ia of the Periodic Table of the Elements and X represents hydrogen, a lower alkyl radical, an aryl radical or an acyl radical Examples of the compounds of metals of Group Ia of the Periodic Table of the Elements include lithium carbonate, sodium carbonate, potassium carbonate, rubidium carbonate, cesium carbonate, lithium bicarbonate, sodium bicarbonate, potassium bicarbonate, rubidium bicarbonate, cesium bicarbonate, lithium nitrate, sodium nitrate, potassium nitrate, rubidium nitrate, cesium nitrate, lithium oxide, sodium oxide, potassium oxide, rubidium oxide, cesium oxide, lithium hydroxide, sodium hydroxide, potassium hydroxide, rubidium hydroxide, cesium hydroxide, lithium methoxide, sodium methoxide, potassium methoxide, lithium phenoxide, sodium phenoxide, potassium phenoxide, sodium formate, lithium acetate, potassium acetate, sodium acetyl acetonate, sodium salt of ethyl acetoacetic acid and the like.

The preferred amount of the catalyst ranges from 0.01 to 10g. base on 1g. of the flowing volume of starting raw material per hour and the above mentioned catalysts may be mixtures of two or more compounds.

The compounds of metals of Group IVa and Va of the Periodic Table of the Elements which are used as promotors in the process of this invention includes carbonates, oxides, formates, acetates, oxalates, halides and nitrates of metals of Group IVa and Va of the Periodic Table of the Elements, especially germanium, tin, lead, arsenic, antimony and bismuth.

Examples of these compounds include tin(II)oxide, tin(IV)oxide, lead(II)oxide, antimony(III)oxide, bismuth(III)oxide, arsenic(III)oxide, germanium(II)oxide, lead(II)carbonate, bismuth(III)carbonate, germanium(II)chloride, tin(IV)chloride, lead(II)chloride, bismuth(III)chloride, antimony(III)chloride, arsenic(III)chloride, germanium(IV)acetate, tin(IV)acetate, arsenic(III)acetate, bismuth(III)acetate, lead(II)nitrate, tin(II)nitrate and bismuth(III)nitrate.

These promotors may also be used as mixtures of two or more of the above mentioned compounds.

The preferred amount of the promotor ranges from 0.5 to 20 weight percent of the catalyst.

In carrying out the reaction of this invention, it is advantageous to support the catalyst on a carrier in order to improve the toughness of the catalyst and catalyst-life. Typical examples of the carrier include silica-gel, alumina, activated carbon, silica-alumina, zinc oxide, boria and silica-boria.

In practicing the reaction of this invention, the catalyst which may be supported on the above mentioned carrier is preferably pre-heated to the reaction temperature and thereafter cyclohexanone and either formaldehyde or acetaldehyde are passed through the pre-heated catalyst.

In order to effect the reaction in vapor phase, the reaction temperature of this invention is in a range of from 150° to 850° C., preferably 250° to 650° C., and the reaction is carried out at atmospheric, subatmospheric or superatomospheric pressure.

To produce 2,6-dimethylphenol, known as 2,6-xylenol, by the reaction of this invention, formaldehyde is reacted with cyclohexanone. If 2,6-diethylphenol is the desired product, acetaldehyde is reacted with cyclohexanone.

In the reaction of cyclohexanone with the aldehyde to produce 2,6-dialkylphenol, 2 moles of the aldehyde are theoretically required for 1 mole of cyclohexanone. But the molar ratio of the aldehyde and cyclohexanone to effect the reaction of this invention varies in accordance with the kind of aldehyde and the reaction conditions. In general, at least 2 moles of the aldehyde are required for 1 mole of cyclohexanone in this invention. However, using 3 to 10 moles of the aldehyde to 1 mole of cyclohexanone is preferable due to the ease in operating the reaction and the economics of the process.

In carrying out the reaction of this invention, the reactants may be sent into a reaction system together with certain pre-heated gases (such as nitrogen, carbon monoxide, carbon dioxide, steam, argon, helium) in order to accelerate vaporization.

According to the process of the present invention, 2,6-dialkylphenol is produced with a high yield and selectivity and can be easily separated and purified from by-products such as monoalkylphenol, trialkylphenol or 2,4-dimethylphenol.

It will be understood from the following Table 1 that inorganic compounds of metals other than Group Ia of the Periodic Table of the Elements are less effective in yield and selectivity of 2,6-dialkylphenol than the catalyst of this invention.

It will be also understood from the following Table 2 that a promotor other than that of the present invention has little or no beneficial effect on the efficiency or selectivity of the 2,6-dialkylphenol preparation.

TABLE 1

| Comparative example number | Catalyst | Ratio of recovery of liquid products (weight percent) | Conversion of cyclohexanone (mole percent) | Yield based on cyclohexanone (mole percent) | | | |
|---|---|---|---|---|---|---|---|
| | | | | o-Cresol | 2,6-dimethyl-phenol | 2,4-dimethyl-phenol | 2,4,6-trimethyl-phenol |
| 1 | $Ca_3(PO_4)_2$ | 30 | 95 | 7 | 11 | 1 | 1 |
| 2 | Active carbon | 46 | 84 | 8 | 24 | 2 | 2 |
| 3 | $Ca_3(PO_4)_2$-active carbon (20% by weight) | 47 | 100 | 20 | 17 | | |
| 4 | $Al_2O_3$ | 59 | 98 | 11 | 3 | 4 | 2 |
| 5 | BeO | 46 | 77 | 3 | 3 | 8 | 1 |

TABLE 1—Continued

| Comparative example number | Catalyst | Ratio of recovery of liquid products (weight percent) | Conversion of cyclohexanone (mole percent) | Yield based on cyclohexanone (mole percent) | | | |
|---|---|---|---|---|---|---|---|
| | | | | o-Cresol | 2,6-di-methyl-phenol | 2,4-di-methyl-phenol | 2,4,6-tri-methyl-phenol |
| 6 | MgO | 35 | 85 | 1 | 5 | 13 | 10 |
| 7 | ZnSO₄ | 48 | 71 | 5 | 2 | 2 | |
| 8 | CdO | 70 | 40 | 10 | 13 | 2 | |
| 9 | CuO | 30 | 95 | 8 | 2 | 4 | 1 |
| 10 | Ag₃PO₄ | 30 | 88 | 2 | 10 | | 2 |
| 11 | CaO | 65 | 50 | 13 | 13 | 9 | 3 |

Reaction conditions: Catalyst, 15 ml.; reactant composition, formaldehyde/cyclohexanone=3 (by mole ratio); flow rate, 15 ml./hr.; reaction temperature, 450° C.; reaction time, 8 hours.

TABLE 2

| Comparative example number | Catalyst | Promoter (mole percent) | Ratio of recovery of liquid products (weight percent) | Conversion of Cyclohexanone (mole percent) | Yield based on cyclohexanone (mole percent) | | | |
|---|---|---|---|---|---|---|---|---|
| | | | | | o-Cresol | 2,6-di-methyl-phenol | 2,4-di-methyl-phenol | 2,4,6 tri-methyl-phenol |
| 12 | K₂O | B₂O₃3H₂O² | 79 | 98 | 18 | 42 | 8 | 1 |
| 13 | K₂O | V₂O₃² | 82 | 95 | 9 | 63 | 2 | |
| 14 | K₂O | MoO₂² | 90 | 99 | 8 | 70 | 4 | 3 |
| 15 | K₂O | MnSO₄² | 80 | 100 | 10 | 54 | 8 | 2 |
| 16 | NaAO | ThO₂² | 81 | 99 | 6 | 64 | 2 | 1 |
| 17 | Na₂O | CrO² | 85 | 98 | 4 | 40 | 17 | 3 |
| 18 | Na₂O | NiSO₄² | 90 | 100 | 4 | 71 | 3 | 3 |
| 19 | Na₂O | TiO₂² | 81 | 99 | 13 | 41 | 13 | |

Reaction Conditions: Catalyst, 15 ml.; reactant composition, formaldehyde/cyclohexanone=3 (by mole ratio); flow rate, 15 ml./hr.; reaction temperature, 450° C.; reaction time, 8 hours.

The features of the present invention can more fully be understood by the following non-limiting illustrative examples in which parts are all by weight and percents are all mole percent unless expressly stated to the contrary.

EXAMPLE 1

Two hundred grams of alumina was immersed in 100 ml. of a 5 percent aqueous potassium hydrogen carbonate solution and the whole mixture was evaporated to dryness and calcined at 650° C. An aqueous solution containing cyclohexanone and Formalin at a molar ratio of cyclohexanone to formaldehyde of 1 to 4 was introduced into an 800 mm long quartz U-shaped tube of 20 mm inside diameter packed with 15g of the resulting catalyst and maintained at 600° C. in a fluidized bath at a flow rate of 15 ml./hr. for 8 hours while passing therein nitrogen at a flow rate of 180 ml./min. The reaction products were collected in a receiver cooled with water and dryice-methanol.

Another run was operated using, as catalyst, 15g of alumina after heat treatment at 650° C. The results are shown in Table 3.

When alumina alone was used as catalyst the rate of recovery of liquid products was much lower due to the decomposition of the reactants. A large amount of carbon monoxide, carbon dioxide, methane, ethane and ethylene was observed in the vapor after the reaction. Furthermore, the formation of phenol by dehydrogenation of cyclohexanone, m-cresol and p-cresol besides o-cresol, 2,4-dimethylphenol and 2,4,6-dimethylphenol was remarkable and consequently the selectivity was very low. In contrast, when a potassium oxide catalyst supported on alumina was used the selectivity of 2,6-dimethylphenol was markedly improved and 2,6-dimethylphenol was obtained with a high yield.

TABLE 3

| Liquid Products (%) | Catalyst | |
|---|---|---|
| | Al₂O₃ | K₂O—Al₂O₃ |
| Cyclohexanone | 5.5 | 0.4 |
| Cyclohexanol | 1.7 | 0 |
| Phenol | 35.9 | 3.8 |
| o-Cresol | 18.9 | 13.4 |
| m-Cresol & p-Cresol | 12.3 | 0 |
| 2,6-Dimethylphenol | 5.7 | 74.8 |
| 2,4-Dimethylphenol | 7.3 | 1.8 |
| Other dimethylphenols | 1.8 | 0 |
| 2,4,6-Trimethylphenol | 3.0 | 3.2 |
| Others | 8.2 | 2.4 |
| Ratio of recovery of liquid products (weight %) | 58.5 | 88.9 |

EXAMPLE 2

The effect of methanol in Formalin in the reactant solution was investigated using, as catalyst, silica-alumina and sodium carbonate supported on silica-alumina. Five hundred grams of silica-alumina was immersed in 200 ml. of a 5 percent aqueous sodium carbonate solution and the whole mixture was evaporated to dryness and calcined at 550° C. for 4 hours. An aqueous solution containing cyclohexanone, formaldehyde and methanol at a molar ratio of 1:4:0.1 was introduced into the same reaction tube as in Example 1 packed with 15g of the resulting catalyst and maintained at 350° C. at a flow rate of 15 ml./hr. for 8 hours. This run was repeated in the absence of methanol. Another run was conducted using, as catalyst, 15g of alumina after heat treatment at 650° C. in the absence of methanol. The results are tabulated in Table 4.

TABLE 4

| Liquid Products (%) | Catalyst Silica-alumina | Na₂CO₃-Silica-alumina¹ | Na₂CO₃-Silica-alumina² |
|---|---|---|---|
| Cyclohexanol | | 10.3 | 0.4 | 0.5 |
| Phenol | | 14.6 | 1.4 | 1.4 |
| o-Cresol | | 23.1 | 14.2 | 14.3 |
| m-Cresol & p-Cresol | 12.8 | 0.1 | 0 |
| 2,6-Dimethylphenol | 8.1 | 80.9 | 80.3 |
| 2,4-Dimethylphenol | 11.0 | 0.6 | 0.4 |
| Other dimethylphenols | 0.3 | — | — |
| 2,4,6-Trimethylphenol | 3.0 | 2.0 | 2.0 |
| Others | 16.1 | 0.8 | 1.1 |
| Ratio of recovery of liquid products (weight %) | 70.3 | 94.3 | 94.8 |

Note: (1) Absence of methanol
(2) Presence of methanol

EXAMPLE 3

Five hundred grams of active carbon was immersed in a methanol aqueous solution containing 0.1 mol of sodium phenoxide and the whole mixture was evaporated to dryness and further dried at 400° C. in a nitrogen atmosphere to activate the catalyst. Fifteen grams of this catalyst was filled in the same reaction tube as in Example 1 and the reaction was effected at 250° C. for 8 hours. Eighty four grams of liquid products were collected and the organic layer separated from the liquid products was found to contain 70.3% of 2,6-dimethylphenol, 11.3% of o-cresol and 1.3% of 2,4,6-trimethylphenol by analysis with a gas chromatograph.

EXAMPLE 4

Two grams of lithium hydroxide was supported on 300g of silica alumina - zinc oxide at a weight ratio of 1 to 3 and the whole was calcined at 400° C. for 2 hours. Fifteen grams of this catalyst was filled in the same reaction tube as in Example 1 and the reaction was effected at 400° C. for 6 hours in the same manner as in Example 1. Sixty-four grams of liquid products were collected and the organic layer separated from the liquid products was found to contain 65.2% of 2,6-dimethylphenol, 18.5% of o-cresol and 3.3% of 2,4,6-trimethylphenol by analysis with a gas chromatograph.

EXAMPLE 5

Eight hundred grams of silica gel was added to 500 ml. of a 5 percent aqueous solution of cesium carbonate and sodium carbonate at a weight ratio of 1 to 5 and the whole was evaporated to dryness and calcined at 450° C. for 2 hours to obtain a cesium-sodium catalyst supported on silica gel. Fifteen grams of this catalyst was filled in the same reaction tube as in Example 1 and the reaction was effected at 450° C. for the specified time in the same manner as in Example 1. The results are shown in Table 5

TABLE 5

COMPOSITION OF REACTION PRODUCTS

| Reaction time (hour) | Ratio of recovery of liquid products (Weight %) | 2,6-Dimethyl-phenol (%) | o-Cresol (%) | 2,4,6-tri-methylphenol (%) |
|---|---|---|---|---|
| 1 | 90.2 | 83.0 | 10.2 | 3.2 |
| 12 | 91.3 | 84.2 | 11.1 | 1.8 |
| 96 | 92.5 | 80.0 | 11.7 | 1.6 |
| 144 | 93.0 | 75.6 | 13.2 | 1.5 |

EXAMPLE 6

Two hundred grams of silica gel was immersed in 100 ml. of a 5 percent aqueous solution of sodium carbonate and the whole mixture was evaporated to dryness and thereafter calcined at 600° C. for 4 hours. Fifteen grams of this catalyst was filled in the same reaction tube as in Example 1 and a mixed aqueous solution containing three parts of acetaldehyde and 1 part of cyclohexanone was introduced to the reaction tube at 500° C. for 8 hours in the same manner as in Example 1. Ninety one grams of liquid products were collected and the organic layer separated from the liquid products was found to contain 68.5% of 2,6-diethylphenol, 13.8% of o-ethylphenol and 5.3% of triethylphenol by analysis with a gas chromatograph.

EXAMPLE 7

Two hundred grams of silica-lead(II)oxidi at a weight ratio of 10 to 1 was immersed in 150 ml. of a 5 percent aqueous solution of potassium carbonate and the whole mixture was evaporated to dryness and thereafter calcined at 450° C. for 2 hours. Fifteen grams of this catalyst was filled in the same reaction tube as in Example 1 and a mixed aqueous solution containing four parts of acetaldehyde and 1 part of cyclohexanone was introduced to the reaction tube at 450° C. for 4 hours. The rate of recovery of liquid products was 88.8 percent and the organic layer separated from the liquid products was found to contain 72.3% of 2,6-diethylphenol, 14.6% of o-ethylphenol and 4.3% of triethylphenol on the average.

EXAMPLE 8

To 200g of silica sol there were added an aqueous sodium carbonate solution containing 0.05 mol of sodium carbonate and then an aqueous arsenic acid solution containing 0.01 mol of arsenic acid. Thereafter to the resulting mixture there was added 20g of alumina sol and the whole gel was evaporated to dryness under reduced pressure, calcined at 500° C. for 5 hours and pulverized. Fifteen milliliters of this catalyst was filled in an 800 mm. long quartz tube of 20 mm. inside diameter, which was preheated at 380° C. for 2 hours. Two hundred milliliters of aqueous solution containing 9.5g of formaldehyde and 10.5g of cyclohexanone was continuously passed thereto at a flow rate of 20 ml./hr. for 8 hours. 150.3g of liquid products were collected and the organic layer separated from the liquid products was found to contain 86.2% of 2,6-dimethylphenol, 10.3% of o-cresol and 2.0% of 2,4,6-trimethylphenol by analysis with a gas chromatograph.

EXAMPLE 9

The catalyst was prepared in the same manner as in Example 8 using 0.02 mol of fine powder germanium oxide instead of arsenic acid. The reaction was effected using 15 ml. of this catalyst at 350° C. for 3 hours in the same manner as in Example 8. 58.5g of liquid products were collected and the organic layer was found to contain 83.2% of 2,6-dimethylphenol, 12.3% of o-cresol and 1.6% of 2,4,6-trimethylphenol.

Example 10

To 100g of silica sol there were added an aqueous solution containing 0.05 mol of lead(II)nitrate and an aqueous solution containing 0.025 mol of potassium hydroxide. The whole mixture was evaporated to dryness under reduced pressure and thereafter calcined at 600° C. for 5 hours to activate the catalyst. Fifteen milliliters of this catalyst was charged in a quartz U-shaped tube of 20 mm. inside diameter and 800 mm. length and the same reactant solution as in Example 8 was introduced into the reaction tube at a flow rate of 15 ml./hr. for 10 hours at 550° C. 126.8g of liquid products were collected and the organic layer separated from the liquid products was found to contain 87.3% of 2,6-dimethylphenol, 9.1% of o-cresol and 0.8% of 2,4,6-trimethylphenol.

EXAMPLE 11

To 600g of silica sol there were added an aqueous solution of 0.1 mol of tartar emetic and diluted hydrochloric acid and the whole mixture was evaporated to dryness at a temperature ranging from 70° to 80° C. under reduced pressure, calcined at 500° C. for 6 hours, pulverized, immersed in a 1 N potassium carbonated solution at a temperature of 50° to 60° C., filtered off and again calcined at 500° C. for 6 hours. Two hundred milliliters of an aqueous solution containing 23g of formaldehyde and 10g of cyclohexanone was continuously introduced into the same reaction tube as in Example 8 packed with 15 ml. of the resulting catalyst at a flow rate of 10 ml./hr. for 6 hours in the same manner as in Example 8. 58.4g of liquid products were collected and the organic layer separated from the liquid products was found to contain 88.3% of 2,6-dimethylphenol, 8.2% of o-cresol and 1.4% of 2,4,6-trimethylphenol by analysis with a gas chromatograph.

EXAMPLE 12

One hundred grams of silica gel was immersed in an aqueous solution of 0.03 mol of potassium stannate and the whole mixture was left to stand overnight, evaporated to dryness, calcined at 550° C., immersed in 100 ml. of a 3% aqueous solution of potassium carbonate, evaporated to dryness and again calcined at 550° C. An aqueous solution containing cyclohexanone and acetaldehyde at a molar ratio of 1 to 3 was introduced into the same reaction tube as in Example 8 packed with 15 ml. of the resulting catalyst at a flow rate of 15 ml./hr. at 550° C. for 10 hours. The organic layer separated from the liquid products was found to contain 74.8% of 2,6-diethylphenol, 13.3% of o-ethylphenol and 2.1% of tristhylphenol.

EXAMPLE 13

1 part of sodium oxide, 0.2 part of lead(II)oxide and 3 parts of arsenic(III)oxide were supported on 100 parts of active carbon. 15 ml. of this catalyst was filled in the same reaction tube as in Example 8 and the reaction was effected at 430° C. in the same manner as in Example 8. One hundred forty-eight grams of liquid products were collected and the organic layer was found to contain 88.5% of 2,6-dimethylphenol and 8.1% of o-cresol.

EXAMPLE 14 to 19

An aqueous solution containing cyclohexanone and formaldehyde at a molar ratio of 1 to 3 was introduced into the same reaction tube as in Example 1 packed with 15g of the catalysts prepared in the same manner as in Example 1 and maintained at 450° C. at a flow rate of 15 ml./hr. for 8 hours in the same manner as in Example 1. The results are tabulated in Table 6.

TABLE 6

| Example Number | Catalyst | Ratio of recovery of liquid products (weight percent) | Conversion of cyclohexanone (mol percent) | Yield based on cyclohexanone (mol percent) | | | |
|---|---|---|---|---|---|---|---|
| | | | | o-Cresol | 2,6-di-methyl-phenol | 2,4-di-methyl-phenol | 2,4,6-tri-methyl-phenol |
| 14 | Cs$_2$O | 87 | 99 | 9 | 73 | 1 | 3 |
| 15 | KOCCH$_3$ (=O) | 90 | 99 | 8 | 75 | 2 | 3 |
| 16 | NaOCH$_3$ | 92 | 100 | 5 | 77 | 2 | 1 |
| 17 | RbNO$_3$ | 85 | 100 | 11 | 69 | 1 | 1 |
| 18 | NaHCO$_3$ | 88 | 100 | 11 | 75 | 1 | 3 |
| 19 | CH$_3$C=CHCOCH$_3$ (ONa) | 88 | 999 | 4 | 81 | | 3 |

EXAMPLE 20 to 25

Two hundred milliliters of an aqueous solution containing 9.5g of formaldehyde and 10.5g of cyclohexanone was continuously introduced into the same reactor as in Example 8 packed with 15 ml. of the catalysts prepared in the same manner as in Example 8 and maintained at 450° C. under the same conditions as in Example 8. The results are shown in Table 7.

TABLE 7

| Example Number | Catalyst | Promotor | Ratio of recovery of liquid products °weight percent' | Conversion of cyclohexanone °mol percent' | Yield based on cyclohexanone (mol percent) | | | |
|---|---|---|---|---|---|---|---|---|
| | | | | | o-Cresol | 2,6-di-methyl-phenol | 2,4-di-methyl-phenol | 2,4,6-tri-methyl-phenol |
| 20 | K$_2$O | GeCl$_2$ | 94 | 100 | 10 | 79 | | 2 |
| 21 | Do | PbCl$_2$ | 94 | 100 | 4 | 83 | | 2 |
| 22 | Do | Bi(NO$_3$)$_3$ | 97 | 99 | 3 | 88 | 1 | 2 |
| 23 | Na$_2$O | As(OCCH$_3$)$_3$ (O) | 93 | 100 | 3 | 85 | | 1 |
| 24 | Do | SbCl$_3$ | 98 | 100 | 3 | 89 | | 3 |
| 25 | Do | SnO$_2$ | 97 | 100 | 6 | 83 | 2 | |

What is claimed is:

1. The process for the preparation of a 2,6-dialkylphenol which comprises reacting cyclohexanone with either formaldehyde or acetaldehyde in the vapor phase at a temperature of from 150° to 850° C. in the presence of, a. as a catalyst, at least one member of the group consisting of lithium carbonate, sodium carbonate, potassium carbonate, rubidium carbonate, cesium carbonate, lithium bicarbonate, sodium bicarbonate, potassium bicarbonate, rubidium bicarbonate, cesium bicarbonate, lithium nitrate, sodium nitrate, potassium nitrate, rubidium nitrate, cesium nitrate, lithium oxide, sodium oxide, potassium oxide, rubidium oxide, cesium oxide, lithium hydroxide, sodium hydroxide, potassium hydroxide, rubidium hydroxide, cesium hydroxide, lithium methoxide, sodium methoxide, potassium methoxide, lithium phenoxide, sodium phenoxide, potassium phenoxide, sodium formate, lithium acetate, potassium acetate, sodium axetyl acetonate, sodium salt of ethyl acetoacetic acid and b. as a promoter, at least one member of the group consisting of tin (II) oxide, tin (IV) oxide, lead (II) oxide, antimony (III) oxide, bismuth (III) oxide, arsenic (III) oxide, germanium (II) oxide, lead (II) carbonate, bismuth (III) carbonate, germanium (II) chloride, tin (IV) chloride, lead (II) chloride, bismuth (III) chloride, antimony (III) chloride, arsenic (III)-chloride, germanium (IV) acetate, tin (IV) acetate, arsenic (III)-acetate, bismuth (III) acetate, lead (II) nitrate, tin (II) nitrate and bismuth (III) nitrate.

2. The process of claim 1, wherein said reaction is effected at a temperature of from 250° to 650° C.

3. The process of claim 1, wherein said catalyst is supported on a carrier selected from the group consisting of silica-gel, alumina, activated carbon, silica-alumina, zinc oxide, boria and silica-boria.

4. The process of claim 1, wherein 3 to 10 moles of the aldehyde are used for 1 mole of cyclohexanone.

5. The process of claim 1, wherein the amount of the catalyst ranges from 0.01 to 10g. based on 1g. of the flowing volume of cyclohexanone and the aldehyde.

6. The process of claim 2, wherein the amount of the promoter ranges from 0.5 to 20 percent by weight of the amount of the catalyst.

* * * * *